No. 12,339. REISSUED APR. 25, 1905.

H. E. BERKEY.

FASTENING DEVICE.

APPLICATION FILED APR. 20, 1904.

WITNESSES:

C. H. Walker,

Max Hofmann

INVENTOR

Harvey E. Berkey

BY H. W. Arnold

Attorney

PHOTO-LITHOGRAPHED BY SACKETT & WILHELMS LITHO. & PT'G. CO. NEW YORK

No. 12,339. Reissued April 25, 1905.

UNITED STATES PATENT OFFICE.

HARVEY E. BERKEY, OF MONONGAHELA, PENNSYLVANIA, ASSIGNOR TO THE PIONEER SUSPENDER COMPANY, A CORPORATION OF PENNSYLVANIA.

FASTENING DEVICE.

SPECIFICATION forming part of Reissued Letters Patent No. 12,339, dated April 25, 1905.

Original No. 752,372, dated February 16, 1904. Application for reissue filed April 20, 1904. Serial No. 204,139.

*To all whom it may concern:*

Be it known that I, HARVEY E. BERKEY, a citizen of the United States, residing at Monongahela, in the county of Washington and State of Pennsylvania, have invented a new and useful Fastening Device, of which the following is a specification.

This invention relates to certain new and useful improvements in fastening devices such as are ordinarily employed in garment-supporters and analogous devices; and the invention has for its object to construct a device of this kind which may be advantageously used in connection with many articles of personal wear, such as suspenders, belts, hose-supporters, and the like.

My invention consists in the employment of two members, preferably of sheet metal, one of which has a head and the other of which has means adapted to engage with the head; and the object of the invention is to construct a device of this character in which one member will be securely fastened to the other member and a device in which the two members when fastened together will lie so closely to a flat position as to not impart any discomfort whatever to the wearer, all of which will be hereinafter specifically described, and particularly pointed out in the claims.

A further object of the present invention is to construct a device of this character which may be used in connection with garment-supporters or the like of various descriptions, the connection between the two members being substantially the same in all constructions to which the device may be adapted.

In describing the invention in detail reference is had to the accompanying drawings, forming a part of this specification, and wherein like characters of reference indicate like parts throughout the several views, in which—

Figure 1:
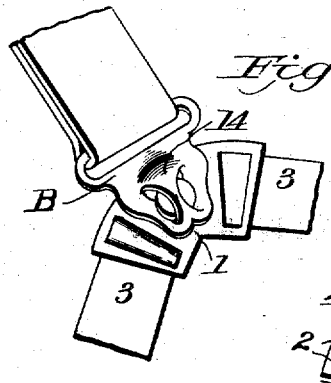
Figure 2:
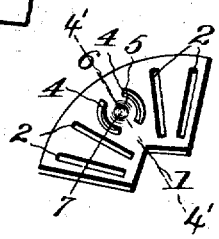
Figure 3:
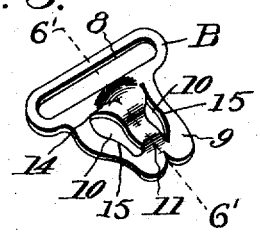
Figure 4:
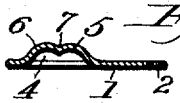
Figure 6:
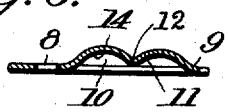
Figure 5:
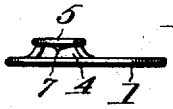
Figure 7:
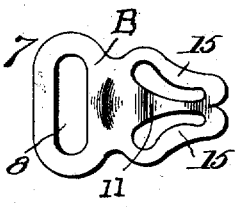
Figure 8:
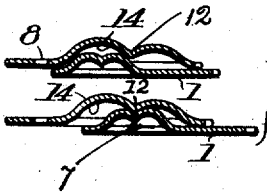
Figure 9:
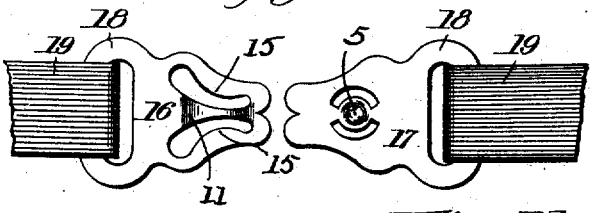
Figure 10:
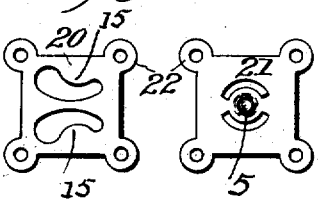
Figure 11:
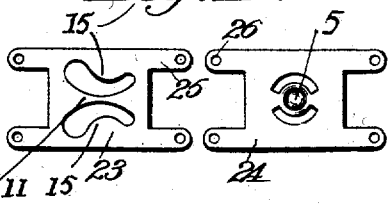

Figure 1 is a plan view, partly in perspective, showing the construction of the device as employed for a hose-supporter. Fig. 2 is a detail perspective view of the head member of the fastener. Fig. 3 is a like view of the coöperative lip member. Fig. 4 is a cross-sectional view of the head member on line 4′ 4′ of Fig. 2. Fig. 5 is a side elevation of the same. Fig. 6 is a cross-sectional view of the lip member on line 6′ 6′ of Fig. 3. Fig. 7 is a top plan view of the lip member. Fig. 8 shows two sectional views of the members, illustrating the members when placed in position for fastening and also fastened. Fig. 9 is a top plan view showing the fastener as adapted for use on a belt or the like. Fig. 10 is a like view showing the fastening as adapted for a hook and eye. Fig. 11 is a like view showing the fastener as constructed and particularly adapted for use in connection with ladies' dress-skirts, pantaloons, or the like.

As shown in Figs. 1 to 8, inclusive, the fastening comprises two interlocking members—namely, the head member 1 and the lip member B. The head member 1 is of a somewhat triangular shape, being provided adjacent its ends with slots 2, which are adapted to receive a tape or band 3, forming a part of the hose-supporter. This member 1 is provided centrally of the length of its longest arc with segment-shaped slots 4, placed so as to be within the bounds of a circle, the material forming the flattened circular head 5 between these segment-shaped slots being connected to the top of the plate by necks 6. The head 5 is forced out beyond the plane of the upper face of the member 1, but is integral therewith, and is provided centrally of its upper face with a small depression 7. The lip member B is a flat plate and embodies a loop or eye 8, provided with an extension or lug 9, which extension or lug has slots 10 therein, forming the coöperating, convergent, oppositely-disposed, and symmetrical-curved lips 15. From an inspection of Fig. 7 it will be apparent that the margins of these lips are in arcs the chords of which converge toward the end of the member B away from the loop 8. These lips 15 are adapted to receive and engage the head 5 of member 1. Between the slots 10 is formed the spring-tongue 11, adapted to lie over the top of and engage with the head 5, as seen in Fig. 1 of the drawings, to form spring-locking means between said two members, the tongue 11 being preferably provided with a depression 12, forming a small stud, which is adapted to engage in the depression 7 in the upper face of the head 5. The inner or end portion of the lug 9 and the portion adjacent the loop 8 are formed on their under faces with concave portion 14 slightly out of the plane of the margins of the lips 15, which concave portion is adapted to receive the head 5, as seen in Fig. 8 of the drawings, prior to engaging the two devices, the engagement being effected by placing the head 5 in the depression or concave portion 14 and then pulling outwardly on one member or the other, so as to engage the lips 15 of the lug 9 in under the head or button 5. The purpose of having the margins of lips 15 convergent substantially throughout their length is to afford means occupying a minimum space to engage and securely maintain the head of the other member. The greater space between these margins should be sufficient to permit the insertion of the head 5, and there should be just sufficient longitudinal movement of head 5 with respect to the lips to secure its retention thereby. It must be obvious that if member B were unduly long it would project beyond member 1, and when used as a hose-supporter, in which the upper portion of the web assumes a substantially circular position, the object of providing a flat member, as set forth above, would be largely defeated, since the two members combined would tend to lie unsymmetrically with respect to the web in the operative position. It will be obvious from a simple inspection of the drawings that the engagements between head 5 and lips 15 and between the stud 12 and depression 7 are such as to permit a limited relative rotative movement between the two interlocking members 1 and B, so that said two interlocking members shall assume the proper position with respect to the strains exerted thereon when the elastic band is under tension.

The term "head" as used above is the broad term, which may properly include various forms of circular portions connected to the body portion by a neck or necks. The specific form of head 5 shown in the drawings, especially in Fig. 5, may with propriety be termed a "button." I have described this head or button member 1 as provided with slots 2 for receiving the tape or band of the hose-supporter. This tape or band 3, which in a hose-supporter is usually elastic and is termed the "web," is shown in Fig. 1 to extend in two directions from said member 1. The term "two webs" as used in the claims is meant to include such an arrangement—that is, a web extending in two directions from member 1. This may include a continuous web threaded through the member, as shown in Fig. 1, or two separate pieces of web, one end of each being attached to said button member 1.

The lip member B may be said to constitute a hook member. The convergent lips of this hook member B form a large opening from which leads a reduced socket. This socket when the hook is engaged with the head or button member receives the button. The flexible central tongue 11, which is connected with this hook member B, is adapted to engage with spring tension upon the button member.

In Fig. 9 the construction of the device is similar in all respects in so far as the fastening is concerned and is particularly adapted for use on belts and the like. In said construction the members 16 17 are each provided with a loop 18 to receive the respective ends of the belt 19. The head 5 and also the lips 15 and tongue 11 are the same in construction and the same reference-numerals have been applied thereto.

In Fig. 10 I show the device constructed as particularly adapted for use as a hook and eye, and in this construction employ two members 20 21, respectively, provided at their corners with loops or eyes 22 to permit of the sewing of the hook member and eye member to the garment. The head 5 and the lips 15 are of the same construction as aforedescribed. Also in Fig. 11 I show the device constructed as particularly adapted for use in connection with ladies' skirts and as a fastening for pantaloons, and in this construction provide two members 23 24, respectively, provided at their ends with barbs 25, adapted to be inserted underneath the fabric, and each may be, if desired, provided with eyes 26 to permit of their being sewed or stitched in position. The head 5 and the lips 15 are of the same construction as aforedescribed.

Various other ways of applying the invention and its adaptability to various devices in the nature of garment-fasteners or analogous devices will readily suggest themselves.

What I claim is—

1. In a fastening device of the character described, the combination of two interlocking members, one member provided with a head, the other member provided with lips having margins for embracing the head, said margins convergent substantially throughout their length, and said lips being formed with open spaces between them and the intermediate portion of the member, said intermediate portion being slightly out of the plane of the margins of the lips.

2. In a fastening device of the character described, the combination of two interlocking members, one member provided with a head, the other member provided with lips having curved margins for embracing the head, said margins being convergent substantially throughout the length thereof, said lips being formed with open spaces between them and the intermediate portion of the member, said intermediate portion being slightly out of the plane of the margins of the lips.

3. In a fastening device of the character described, the combination of two interlocking members, one member provided with a head, the other member provided with lips having margins for embracing the head, said margins convergent substantially throughout their length, and said lips being formed by striking up the plate so as to leave slots between the lips and the intermediate portion of said member, and so as to leave the intermediate portion slightly out of the plane of the margins of said lips.

4. In a fastening device of the character described, the combination of two interlocking members, one member being provided with a head, the other member provided with lips having curved margins for coöperating with the head, said margins being convergent substantially throughout the length thereof, said lips being formed by striking up the plate so as to leave slots between the lips and the intermediate portion of said member, and so as to leave the intermediate portion slightly out of the plane of said margins of said lips.

5. In a fastening device of the character described, the combination of two interlocking members, one member provided with a head, the other member provided with lips and an intermediate portion, the said portion and the lips coacting with the head, said lips having margins convergent substantially throughout their length and formed with open spaces between them and the intermediate portion of the member, said intermediate portion being slightly out of the plane of the margins of the lips.

6. In a clasp of the kind described, the combination with a sheet-metal button member having a button thereon and also provided with means for the attachment of two webs, of a hook member adapted to pivotally engage the button member and having a large opening from which leads a reduced socket, said socket, when the hook is engaged with the button member, receiving the button, said hook member being also provided with a flexible central tongue to bear on the head of the button when said member is engaged with the button member.

HARVEY E. BERKEY

Witnesses:
MAMIE BROWN,
CARL E. GIBSON.